United States Patent [19]

Hares et al.

[11] 3,902,910

[45] Sept. 2, 1975

[54] BARIUM FLINT OPHTHALMIC GLASSES

[75] Inventors: George B. Hares; David W. Morgan, both of Corning, N.Y.

[73] Assignee: Corning Glass Works, Corning, N.Y.

[22] Filed: Feb. 19, 1974

[21] Appl. No.: 443,495

[52] U.S. Cl. .................. 106/47 Q; 106/53; 106/54
[51] Int. Cl. ............................................. C03c 3/08
[58] Field of Search .................. 106/47 Q, 47 R, 53

[56] References Cited
UNITED STATES PATENTS

| | | | |
|---|---|---|---|
| 2,214,385 | 9/1940 | Scott | 106/53 |
| 2,313,685 | 3/1943 | Truby | 106/53 |
| 2,435,995 | 2/1948 | Armistead | 106/53 X |
| 2,542,489 | 2/1951 | Duncan | 106/53 X |
| 3,281,255 | 10/1966 | Brewster | 106/53 |
| 3,311,480 | 3/1967 | Brewster | 106/53 |
| 3,481,791 | 12/1969 | Brewster | 106/53 |
| 3,740,242 | 6/1973 | Faulstich | 106/53 X |

*Primary Examiner*—Winston A. Douglas
*Assistant Examiner*—John F. Niebling
*Attorney, Agent, or Firm*—Clinton S. Janes, Jr.; Milton M. Peterson; Clarence R. Patty, Jr.

[57] ABSTRACT

This invention relates to improved barium flint glasses particularly designed for production of segments or buttons for multifocal ophthalmic lenses. The glasses have refractive indices in the range of 1.64 to 1.71, corresponding dispersive indices (nu values) such that the nu value (V) is greater than 260 minus 133 times the refractive index, relatively low liquidus temperatures, and good chemical durability. The glasses consist essentially, in percent by weight, of 33–43% $SiO_2$, 0–4% $B_2O_3$, 33–43% $SiO_2 + B_2O_3$, 4–9% $Na_2O$, 0–4% $K_2O$, 5–10% $Na_2O + K_2O$, 17–24% BaO, 0–3% CaO, 0–5% $La_2O_3$, 22–26% BaO + CaO + $La_2O_3$, 13–28% PbO, 2–5% ZnO, 15–30% PbO + ZnO, 2–4% $TiO_2$, 3–6% $ZrO_2$, and 6–9% $TiO_2 + ZrO_2$.

3 Claims, 1 Drawing Figure

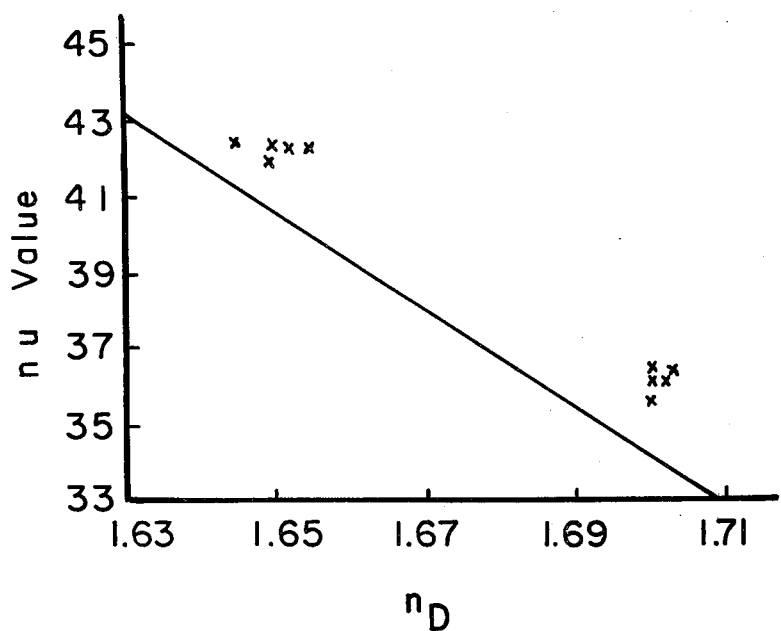

BARIUM FLINT OPHTHALMIC GLASSES

BACKGROUND OF THE INVENTION

The present invention relates to the production of multifocal ophthalmic lenses, and is particularly concerned with improved barium flint ophthalmic glasses for use in segments or buttons for such lenses.

Multifocal ophthalmic lenses are produced by sealing one or more small segments or buttons of flint glass into a recess in a major lens blank molded from a crown glass, the construction and procedure being well understood in the ophthalmic art. A simple embodiment is illustrated, for example, in U.S. Pat. No. 2,214,385, granted Sept. 10, 1940 to M. R. Scott et al. As disclosed there, the major lens blank is usually produced from a spectacle crown glass having a refractive index of 1.523. The segment or button glass is then selected to provide a higher index, generally in the range of 1.57 to 1.71, the actual value being determined by the degree of visual correction required in the completed multifocal lens.

Lead flint glasses were originally devised to produce the higher index segments or buttons. Typical glasses of this type are shown, for example, in U.S. Pat. No. 2,528,634, granted Nov. 7, 1950 to W. H. Armistead. The lead glasses are generally easy to melt and work, and provide excellent refractive index values. However, they have one serious deficiency; namely, a strong dispersion tendency as evidenced by low nu values. In spite of this, the lead glasses are still widely used.

Intensive efforts have been made to develop barium flint glasses as a substitute for the lead flint glasses. In these glasses, barium oxide (BaO) may replace lead oxide (PbO) in varying degrees up to complete replacement. This is illustrated in the Scott et al. patent, above, and in U.S. Pat. Nos. 2,523,264, 2,523,265, and 2,523,266, granted Sept. 26, 1950, and Nos. 2,699,398 and 2,699,399, granted Jan. 11, 1955, all in the name of W. H. Armistead.

The compositions disclosed in these patents have provided very useful glasses for the ophthalmic industry. However, difficulties have been encountered in melting certain barium flint glasses, particularly those having a high refractive index on the order of 1.70. In order to secure the required optical properties in some instances, it has been necessary to employ glasses wherein the liquidus temperature exceeds the glass forming temperature which is about 1,025°C. As a result, devitrified glass accumulates in the delivery chamber of the melting unit, and the production process must be interrupted frequently for thermal flushing of the system.

It has also been difficult to maintain acceptable chemical durability in some of the previously known barium flint glasses. The patents mentioned above, as well as other literature, suggest adding small amounts of $ZrO_2$, $TiO_2$ and/or $Al_2O_3$ to the glass composition to improve chemical durability. $ZrO_2$ and $TiO_2$ also increase refractive index, but the use of these oxides must be limited because $TiO_2$, like lead oxide, has a strong effect on dispersion, and $ZrO_2$ may enhance devitrification tendencies. Accordingly, the addition of a few percent of $Al_2O_3$ has become standard practice because of an apparent improvement with respect to both chemical durability and resistance to devitrification.

Contrary to such prior understanding, we have now found that the chemical durability of certain barium flint glasses is markedly increased when the conventional $Al_2O_3$ addition is omitted. We have further found that small amounts of zinc oxide (ZnO), alone or in conjunction with lime (CaO) and/or lanthana ($La_2O_3$), can be added to the glass, preferably in partial substitution for lead oxide, to lower the liquidus temperature while maintaining optical and sealing characteristics essentially unchanged.

SUMMARY OF THE INVENTION

Based on these and other discoveries, our invention is a barium flint ophthalmic glass having a refractive index in the range of 1.64 to 1.71, corresponding nu values such that the nu value is greater than 260 minus 133 times the rrefractive index, and consisting essentially of, in weight percent on an oxide basis, 33–43% $SiO_2$, 0–4% $B_2O_3$, 33–43% $SiO_2$ + $B_2O_3$, 4–9% $Na_2O$, 0–4% $K_2O$, 5–10% $Na_2O$ + $K_2O$, 17–24% BaO, 0–3% CaO, 0–5% $La_2O_3$, the total BaO + CaO + $La_2O_3$ being 22–26%, 13–28% PbO, 2–5% ZnO, the total PbO + ZnO being 15–30%, 2–4% $TiO_2$, 3–6% $ZrO_2$, the total $TiO_2$ + $ZrO_2$ being 6–9%.

A particularly useful embodiment of the invention consists of 26having a refractive index in the range of 1.69 to 1.71, a dispersive index of at least 33 and consisting essentially, by weight on an oxide basis, of 33–35% $SiO_2$, 4–7% $Na_2O$, 0–4% $K_2O$ with the total $Na_2O$ + $K_2O$ being 5–8%, 17–24% BaO, 0–3% CaO, 0–5% $La_2O_3$, the total BaO + CaO + $La_2O_3$ being 22–28%, 22–28% PbO, 2–5% ZnO, the total PbO + ZnO being 27–30%, 2–4% $TiO_2$, 3–6% $ZrO_2$, the total $TiO_2$ + $ZnO_2$ being 6–9%, and essentially $B_2O_3$ free.

Silica is the primary glass forming oxide in the new glasses. A content of at least 33% is required to provide a stable glass having adequate chemical durability. However, silica does little to enhance optical properties such as refractive index, and its content is limited by the amount of oxide additives required to impart these and other required properties. Thus, where the glass must have a refractive index of at least 1.69, the silica content should not exceed 35%. With respect to prior barium flint glasses, silica is increased to compensate for omission of $Al_2O_3$.

In lower refractive index glasses, up to 4% $B_2O_3$ may be tolerated to soften the glass and improve the index of refraction slightly. It is added in lieu of silica and the total $SiO_2$ + $B_2O_3$ should not exceed 43%. Even this small substitution of $B_2O_3$ should normally be avoided in the higher index (1.69–1.71) glasses.

The refractive index in the present glasses is, to a large extent, a function of the PbO and the BaO contents. Thus at least 13% PbO is required for lower index glasses, whereas at least 22% is required to impart an index of 1.69 or greater. However, as noted earlier, PbO adversely affects dispersion. Accordingly, a particular feature of the present glasses is an upper limit of 28% PbO, whereby an improved nu value (dispersive index) is attained.

An increase in BaO tends to increase the glass softening point, which may interfere with satisfactory sealing in an ophthalmic lens. Increased BaO contents also raise the glass liquidus and enhance devitrification problems. Therefore, while at least 17% BaO is required, the content should not exceed 24%.

A particular feature of the invention is based on our discovery that zinc oxide (ZnO), in limited amounts, willl depress the liquidus temperature. More particularly the presence of at least 2% ZnO enables producing a glass having a 1.70 refractive index and a liquidus temperature below 1,025°C. ZnO is similar to PbO in its influence on glass properties, but does not have the serious adverse effect on dispersive index that characterizes lead oxide. The chemical durability of the glasses diminishes rapidly as ZnO is increased. Accordingly, its individual content should not exceed 5%, and the ZnO + PbO content should not exceed 30%.

Lime (CaO) and lanthana ($La_2O_3$) are optical constituents which may have beneficial effects when used in conjunction with BaO in minor amounts. Thus lime may help to maintain good chemical durability and low liquidus, but in amounts over 3% tends to unduly harden the glass (increase its softening point) and make it difficult to melt and work. Lanthana has a very beneficial effect on refractive index, but is quite expensive. Also, amounts over about 5% tend to increase liquidus and decrease durability. Accordingly, the BaO + CaO + $La_2O_3$ should not exceed 22–26%.

Titania ($TiO_2$) and zirconia ($ZrO_2$) function to improve durability, but, as mentioned earlier, must be limited, respectively, because of adverse effects on dispersion and liquidus. The alkalies, $Na_2O$ and $K_2O$, function primarily as flux oxides to facilitate melting. Their amounts will be adjusted to provide desired sealing characteristics such as expansion coefficient and softening temperature. In the present glasses, the shift from alumina to silica, which tends to raise the softening point, has been balanced by a shift to soda ($Na_2O$) as the primary flux oxide.

Minor amounts of other compatible oxides, in particular fining agents, may be present as required either for melting purposes or for minor property adjustment. Normally these should not exceed about 2% of the composition.

No unusual conditions or practices need be observed in melting the present glasses. Customary batch materials, such as oxides, carbonates and nitrates, may be used in mixing batches for melting. The usual precautions regarding material purity for optical glasses will suffice. The glass batches may be melted in electrically heated melting units at temperatures on the order of 1,450°C. Preferably, the molten glass is subjected to stirring before cooling to a temperature between 1,000° and 1,100°C. for delivery to forming equipment.

DESCRIPTION OF THE DRAWING

It is well recognized in the optical glass art that, in any given family of glasses, the refractive indices of the glasses will generally vary inversely with the dispersive indices. Thus, as the refractive index increases, the dispersive index will decrease. The present glasses then may also be defined with respect to a linear relationship between refractive index and dispersive index as graphically illustrated in the single FIGURE of the accompanying drawing.

In the graphical illustration, refractive index ($n_D$) is plotted along the horizontal axis and dispersive index (nu value) is plotted along the vertical axis. The straight line corresponds to the equation, $$V \text{ (nu value)} = 260 - 133 n_D.$$

Also, the several compositions, hereafter shown as specific examples of the invention, are each represented by a small $x$.

DESCRIPTION OF SPECIFIC EMBODIMENTS

The invention is further described with reference to several specific examples thereof. These examples particularly illustrate two especially useful embodiments of the invention, viz, glasses having refractive indices of 1.69–1.71 and glasses having refractive indices of 1.64–1.66. However, those skilled in the art will have no difficulty, with these examples as a guide, in formulating a glass providing any desired intermediate index.

The following table sets forth, in weight percent on an oxide basis as calculated from the batch, compositions for several glasses exemplifying the embodiment of the invention characterized by a high refractive index in the range of 1.69 to 1.71. The table further includes the customary viscosity-temperature measurements of softening point (S.P.), annealing point (A.P.) and strain point (St.P.), all in °C., the coefficient of thermal expansion (Exp. $\times 10^{-7}$/°C.) between 0° and 300°C., density in g/cc, refractive index ($n_D$), dispersive index (V), liquidus temperature (Liq.), and weight loss in mg./cm.$^2$ (Wt.Loss) as measured on glasses having the indicated calculated formulations.

TABLE I

|  | 1 | 2 | 3 | 4 | 5 |
|---|---|---|---|---|---|
| $SiO_2$ | 34.0 | 34.1 | 33.9 | 33.8 | 34.0 |
| $Al_2O_3$ | — | — | — | — | — |
| $Na_2O$ | 6.5 | 6.1 | 5.8 | 5.8 | 4.5 |
| $K_2O$ | — | — | — | — | 1.8 |
| CaO | 1.0 | 1.0 | 1.0 | 1.0 | .5 |
| BaO | 17.8 | 19.6 | 21.1 | 23.2 | 18.1 |
| $La_2O_3$ | 4.5 | 3.0 | 2.0 | — | 4.4 |
| ZnO | 4.0 | 4.0 | 4.0 | 4.0 | 2.0 |
| PbO | 23.8 | 23.8 | 23.8 | 23.8 | 27.3 |
| $TiO_2$ | 3.0 | 3.0 | 3.0 | 3.0 | 3.0 |
| $ZrO_2$ | 5.2 | 5.2 | 5.2 | 5.2 | 4.2 |
| $As_2O_3$ | 0.1 | 0.1 | 0.1 | 0.1 | 0.1 |
| $Sb_2O_3$ | 0.1 | 0.1 | 0.1 | 0.1 | 0.1 |
| S.P., °C. | 679 | 684 | 686 | 682 | 684 |
| A.P., °C. | 537 | 540 | 541 | 539 | 537 |
| St.P., °C. | 501 | 505 | 506 | 506 | 501 |
| Exp. $\times 10^{-7}$/°C. | 91.8 | 90.7 | 91.4 | 91.5 | 90.5 |
| Density | 4.02 | 4.03 | 4.02 | 4.04 | 4.04 |
| $n_D$ | 1.7035 | 1.7021 | 1.7005 | 1.7006 | 1.7009 |
| V | 36.2 | 36.0 | 36.1 | 36.2 | 35.7 |
| Liq. | 947 | 1012 | 946 | 971 | 925 |
| Wt.Loss (mg./cm.$^2$) | 0.09 | .03 | .03 | .06 | .01 |

Chemical durability of the present glasses is evaluated by a testing procedure widely recognized in the ophthalmic art and known as the AO test. In this test, the surface area of a glass sample is measured; the sample is weighed; it is then immersed in a 10% by weight solution of hydrochloric acid for 10 minutes at 25°C.; removed, washed and dried; then reweighed and the difference in weight calculated as "weight loss" in milligrams per square centimeter of sample surface.

TABLE II sets forth compositions and properties for three glasses closely related to, but outside, the present narrow ranges.

TABLE II

|  | A | B | C |
|---|---|---|---|
| $SiO_2$ | 32.2 | 34.5 | 33.3 |
| $Al_2O_3$ | 2.0 | — | — |
| $Na_2O$ | 4.1 | 3.8 | 5.5 |
| $K_2O$ | 3.4 | 3.4 | — |
| CaO | — | — | 2.0 |
| BaO | 14.6 | 14.6 | 24.0 |
| $La_2O_3$ | 4.5 | 4.5 | 2.0 |

TABLE II-Continued

|  | A | B | C |
|---|---|---|---|
| ZnO | — | — | 8.0 |
| PbO | 30.8 | 30.8 | 16.8 |
| $TiO_2$ | 3.0 | 3.0 | 3.0 |
| $ZrO_2$ | 5.2 | 5.2 | 5.2 |
| $As_2O_3$ | .1 | .1 | .1 |
| $Sb_2O_3$ | .1 | .1 | .1 |
| S.P., °C. | 683 | 681 | 706 |
| A.P., °C. | 535 | 531 | 556 |
| St.P., °C. | 497 | 494 | 519 |
| Exp. × $10^{-7}$/°C. | 92.1 | 92.3 | 90.8 |
| Density | 4.03 | 4.03 | 3.98 |
| $n_D$ | 1.7043 | 1.7025 | 1.6961 |
| V | 34.4 | 34.4 | 38.0 |
| Liq. | 1062 | 1070 | 990 |
| Wt.Loss (mg./cm.²) | 0.17 | .03 | .93 |

Examples A and B illustrate the effect of removing $Al_2O_3$ from a glass of the present type. While other properties undergo relatively small changes, it is apparent that the substitution of $SiO_2$ for $Al_2O_3$ effects a very marked improvement in chemical durability. Minor amounts of $Al_2O_3$ up to about a half percent may be tolerated, but it is generally desirable to avoid adding this oxide and to minimize impurity levels.

These examples also illustrate the high liquidus temperatures that are characteristic of prior barium flint glasses of high refractive index. It is apparent that removing alumina has little effect on liquidus temperature, and that the presence of lanthana alone has little beneficial effect. The addition of a small amount of lime (CaO) is beneficial, but this effect quickly reverses and is lost at a lime level of about 3%. Accordingly lime alone does not provide an adequate solution.

The examples of TABLE I, as compared to those of TABLE II, clearly demonstrate the effectiveness of ZnO in reducing the liquidus to or below 1,025°C. so that glass can be continuously delivered at 1,025°–1,075°C. without serious danger of devitrification. However, the amount of ZnO that can be added is limited by an adverse effect on chemical durability. This is illustrated by example C of TABLE II.

The invention is further illustrated by reference to TABLE III which sets forth the oxide compositions of several glasses together with physical characteristics measured on the glasses, the data being presented in the same manner as in TABLE I. It will be noted that Example 6 is outside the present invention and is included for comparison purposes. This glass, when compared to those of Examples 7 and 8, illustrates the effect of a ZnO addition in these glasses together with a concomitant decrease in CaO and $ZrO_2$ contents. Examples 9 and 10 illustrate the effect of omitting $B_2O_3$ from the composition. The expected decrease in refractive index is observed. Larger additions of $B_2O_3$ than in Examples 7 and 8 would tend to adversely affect chemical durability.

The glasses of TABLE III illustrate an embodiment of the invention characterized by a refractive index in the range of 1.64 to 1.66, a dispersive index greater than 40, and compositions consisting essentially of 38–43% $SiO_2$, 0–4% $B_2O_3$, 38–43% $SiO_2 + B_2O_3$, 6–9% $Na_2O$, 0–4% $K_2O$, 7–10% $K_2O + Na_2O$, 17–24% BaO, 0–3% CaO, 0–5% $La_2O_3$, 22–26% BaO + CaO + $La_2O_3$, 13–18% PbO, 2–5% ZnO, 15–22% PbO + ZnO, 2–4% $TiO_2$, 3–6% $ZrO_2$, 6–9% $TiO_2 + ZrO_2$, the compositions being calculated in percent by weight of an oxide basis.

TABLE III

|  | 6 | 7 | 8 | 9 | 10 |
|---|---|---|---|---|---|
| $SiO_2$ | 38.9 | 38.9 | 38.5 | 42.0 | 40.1 |
| $B_2O_3$ | 3.5 | 3.5 | 3.5 | — | — |
| $Na_2O$ | 8.2 | 8.2 | 8.2 | 8.2 | 8.7 |
| $K_2O$ | — | — | — | — | — |
| CaO | 5.0 | 2.0 | 2.0 | 2.0 | 2.0 |
| BaO | 20.0 | 21.0 | 21.8 | 21.8 | 22.8 |
| $La_2O_3$ | — | — | — | — | — |
| ZnO | — | 4.0 | 4.0 | 4.0 | 5.0 |
| PbO | 14.0 | 14.0 | 13.6 | 13.6 | 13.6 |
| $TiO_2$ | 3.0 | 3.0 | 3.0 | 3.0 | 3.0 |
| $ZrO_2$ | 7.2 | 5.2 | 5.2 | 5.2 | 4.6 |
| $As_2O_3$ | 0.1 | 0.1 | 0.1 | 0.1 | 0.1 |
| $Sb_2O_3$ | 0.1 | 0.1 | 0.1 | 0.1 | 0.1 |
| S.P., °C. | 694 | 673 | 675 | 699 | 686 |
| A.P., °C. | 553 | 536 | 534 | 546 | 534 |
| St.P., °C. | 519 | 503 | 498 | 511 | 498 |
| Exp. × $10^{-7}$/°C. | 91.4 | 91.0 | 91.1 | 91.7 | 91.5 |
| Density | 3.53 | 3.56 | 3.57 | 3.56 | 3.60 |
| $n_D$ | 1.6546 | 1.6501 | 1.6510 | 1.6453 | 1.6485 |
| V | 42.3 | 42.3 | 42.3 | 42.5 | 42.1 |
| Liq. | 938 | 879 | 873 | 879 | 894 |
| Wt.Loss (mg./cm.²) | .01 | .01 | .02 | .02 | 0.2 |

We claim:

1. A barium flint ophthalmic glass having a refractive index in the range of 1.64 to 1.71, a corresponding dispersive index greater than 260 minus 133 times $n_D$, and a composition, as calculated from the batch in weight percent, consisting essentially of 33–43% $SiO_2$, 0–4% $B_2O_3$, 33–43% $SiO_2 + B_2O_3$, 4–9% $Na_2O$, 0–4% $K_2O$, 5–10% $Na_2O + K_2O$, 17–24% BaO, 0–3% CaO, 0–5% $La_2O_3$, 22–26% BaO + CaO + $La_2O_3$, 13–28% PbO, 2–5% ZnO, 15–30% PbO + ZnO, 2–4% $TiO_2$, 3–6% $ZrO_2$, and 6–9% $TiO_2 + ZrO_2$.

2. A barium flint ophthalmic glass in accordance with claim 1 having a refractive index greater than 1.69, a dispersive index greater than 33, and a composition wherein the $SiO_2$ is not over 35%, the $Na_2O$ not over 7% and the total $Na_2O + K_2O$ not over 8%, the PbO is at least 22% and the PbO + ZnO at least 27%, and the glass is essentially free of $B_2O_3$.

3. A barium flint ophthalmic glass in accordance with claim 1 having a refractive index in the range of 1.64 to 1.66, a dispersive index greater than 40, and wherein the composition consists essentially of 38–43% $SiO_2$, 0–4% $B_2O_3$, 38–43% $SiO_2 + B_2O_3$, 6–9% $Na_2O$, 0–4% $K_2O$, 7–10% $K_2O + Na_2O$, 17–24% BaO, 0–3% CaO, 0–5% $La_2O_3$, 22–26% BaO + CaO + $La_2O_3$, 13–18% PbO, 2–5% ZnO, 15–22% PbO + ZnO, 2–4% $TiO_2$, 3–6% $ZrO_2$, 6–9% $TiO_2 + ZrO_2$.

* * * * *

UNITED STATES PATENT OFFICE
CERTIFICATE OF CORRECTION

PATENT NO. : 3,902,910
DATED : September 2, 1975
INVENTOR(S) : George B. Hares and David W. Morgan It is certified that error appears in the above-identified patent and that said Letters Patent are hereby corrected as shown below:

Column 2, line 24, "26" should be -- glasses --.

Column 2, line 30, "22-28%" first occurrence, should be -- 22-26% --.

Signed and Sealed this

*thirtieth* Day of *December 1975*

[SEAL]

Attest:

RUTH C. MASON
*Attesting Officer*

C. MARSHALL DANN
*Commissioner of Patents and Trademarks*